United States Patent [19]

Mita et al.

[11] 4,392,120

[45] Jul. 5, 1983

[54] PATTERN INSPECTION SYSTEM

[75] Inventors: Kikuo Mita; Masayuki Oyama, both of Yokohama; Takashi Yoshida, Kawasaki; Masato Nakashima; Katsumi Fujihara, both of Yokohama; Tadao Nakakuki, Kawasaki, all of Japan

[73] Assignee: A. Aoki & Associates, Tokyo, Japan

[21] Appl. No.: 197,345

[22] PCT Filed: Oct. 25, 1979

[86] PCT No.: PCT/JP79/00271

§ 371 Date: Jun. 30, 1980

§ 102(e) Date: Jun. 23, 1980

[87] PCT Pub. No.: WO80/01002

PCT Pub. Date: May 15, 1980

[30] Foreign Application Priority Data

Oct. 30, 1978 [JP] Japan ............................ 53-133610
Nov. 13, 1978 [JP] Japan ......................... 53-155946[U]
Nov. 28, 1978 [JP] Japan ............................ 53-146865
Nov. 28, 1978 [JP] Japan ............................ 53-146870

[51] Int. Cl.³ ........................ G06K 9/00; G01B 11/02
[52] U.S. Cl. ................................... 382/22; 250/563; 250/572; 356/237; 356/384; 356/387; 382/41
[58] Field of Search ............ 340/146.3 H, 146.3 MA, 340/146.3 AE, 146.3 Q, 146.3 R; 356/237, 239, 384, 387, 383, 379, 380, 376, 377; 250/560, 562, 563, 571, 572; 364/515, 490, 491, 507

[56] References Cited

U.S. PATENT DOCUMENTS

| | | | |
|---|---|---|---|
| 3,758,214 | 9/1973 | Mangelsdorf | 356/384 |
| 3,973,239 | 8/1976 | Kakumoto et al. | 340/146.3 MA |
| 3,993,888 | 11/1976 | Fellman | 340/146.3 E |
| 4,148,009 | 4/1979 | Witthandt | 340/146.3 MA |
| 4,162,482 | 7/1979 | Su | 340/146.3 MA |
| 4,213,117 | 7/1980 | Kembo et al. | 340/146.3 H |
| 4,238,780 | 12/1980 | Doemens | 340/146.3 H |
| 4,240,750 | 12/1980 | Kurtz et al. | 356/237 |

FOREIGN PATENT DOCUMENTS 53-24233 3/1978 Japan .

OTHER PUBLICATIONS

O'Callaghan et al., "Automatic Mask Inspection . . . ", *Symposium of the Society of Photographic Scientists & Engineers,* Feb., 1975.

Levy, "Automated Equipment for 100% Inspection of Photomasks", *Solid State Technology,* May, 1978, pp. 60–71.

Nakashima et al., "Automatic Mask Pattern Inspection for Printed Circuits . . . ", Proceedings of S.P.I.E., Apr. 1979, vol. 182, pp. 38–48.

*Primary Examiner*—Leo H. Boudreau
*Attorney, Agent, or Firm*—Staas & Halsey

[57] ABSTRACT

A pattern inspection system, for inspecting a pattern formed on a base, such as a photo-mask, by means of laser beam scanning, which includes a device for detecting the body and edges of the pattern a memory device having a plurality of memory units for separately storing the detected body and plurality of edges of the pattern, a device for measuring the width of the body of the pattern between two parallel edges of the pattern, a device for detecting and correcting missing pattern edges, a device for inverting the pattern, a device for reducing the pattern and a device for eliminating pinholes and stains within a pattern.

13 Claims, 10 Drawing Figures

PATTERN INSPECTION SYSTEM

BACKGROUND OF THE INVENTION

The present invention relates to a pattern inspection system for inspecting a pattern formed on a base. The present invention is used for inspecting patterns of photo-masks which are used in the production of printed circuits.

In the prior art there is a method for inspecting patterns of photo-masks which compares a pattern to be inspected with a reference pattern by means of a microscope. This method has two limitations; (1) it is not possible for a person to measure the width of the pattern, and (2) the method requires that the two patterns can be aligned. This prior art method is disclosed in, for example, the thesis "Automated Equipment for 100% Inspection of Photomasks", by K. Levy, Solid State Technology, p. 60 to 71, May 1978.

There is another prior art method for inspecting patterns of photo-masks, in which pattern data consisting of electrical signals transduced from light scanning a pattern to be inspected are compared with reference pattern data converted from the design data of a photo-mask. This method has three limitations in that it requires a process to align the reference and scan data in, the original design data for the reference pattern must be generated and a high speed computer for converting the original design data is necessary. This prior art method is disclosed in, for example, the thesis "Automatic Mask Inspection for Registration Errors and Critical Dimensions", by F. G. O'Callaghan et al, Symposium of Society of Photographic Scientists and Engineers, February 1975.

The present invention has been proposed in order to solve the problem involved in the prior art pattern inspection methods, as set forth above, and to provide a more precise and practical pattern inspection system without using reference pattern data.

A preceding invention regarding a pattern inspection system invented by some of the inventors of the present invention was disclosed in the Japanese Patent Application Laid-open No. 53-24233. This pattern inspection system includes light scanning means for scanning a photo-mask pattern being tested by a light beam, means for providing information indicating the width of the pattern in the direction of scanning by detecting the light transmitted through or reflected by the photo-mask having the pattern, and means for providing information indicating the angle of the pattern with respect to the direction of scanning by detecting the light diffracted at the edge of the pattern. In this system, the width of the pattern is measured by combining the information indicating the width of the pattern and the information indicating the angle of pattern. The present invention utilizes the technique of this preceding invention.

SUMMARY OF THE INVENTION

The present invention includes means for separately examining photo-mask patterns for defects in a plurality of directions and means for separately storing the information obtained from the examination of the patterns in a regions of the memory device corresponding to the plurality of directions, respectively.

A principal object of the present invention is to provide a correct, rapid and practical system for inspecting patterns, eliminating the process of aligning two patterns, eliminating the need for reference data and eliminating the need for a high speed computer.

Another object of the present invention is to provide a pattern inspection system to deal with various types of defects in a pattern.

DETAILED DESCRIPTION OF THE PREFERRED EMBODIMENT

Figure 1:
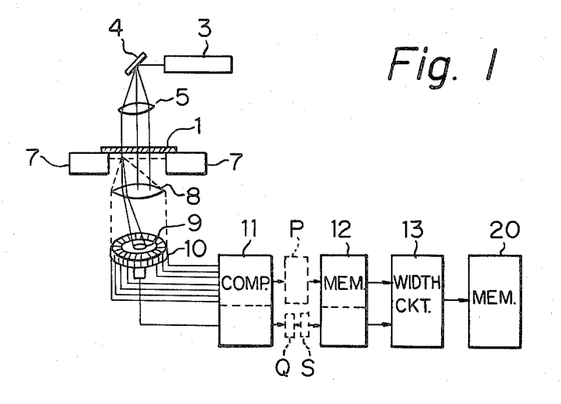
FIG. 1 is a schematic diagram of a pattern inspection system in accordance with an embodiment of the present invention.
Figure 2:
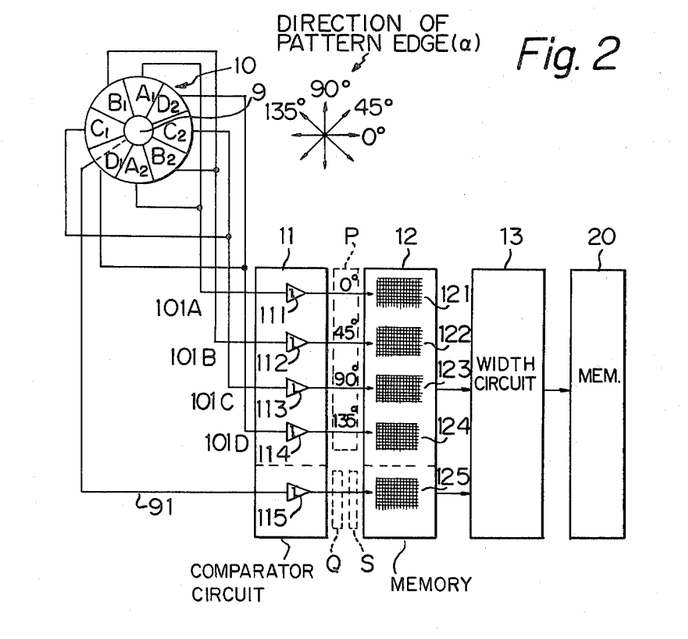
FIG. 2 illustrates the details of the light signal detecting device in the system of FIG. 1.
Figure 3:
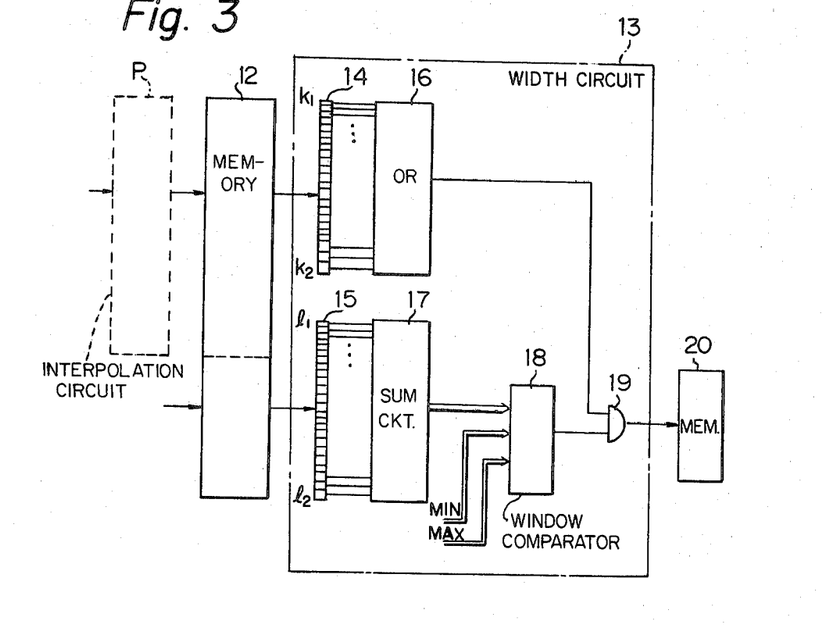
FIG. 3 illustrates the details of the pattern width measuring device in the system of FIG. 1.

A pattern inspection system for inspecting a pattern of a photo-mask is illustrated in FIGS. 1, 2 and 3.

Figure 4:
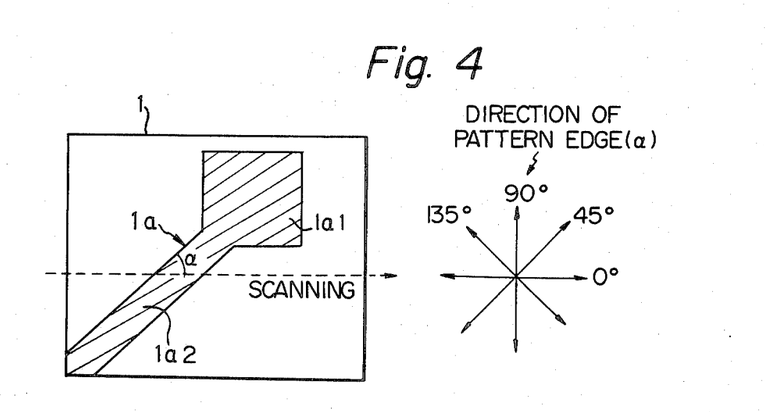
FIG. 4 illustrates an example of a photo-mask having a pattern for which the inspection is effected in accordance with the present invention.

A process to detect the angle of the edges of a pattern will not be described. A laser beam emitted by a laser beam source 3 is periodically deflected in a first direction by light deflecting means, such as a glavanically activated mirror 4, then, passes through a scanning lens 5, and then, is projected through a photo-mask 1 having a pattern fixed to a stage 7 moving in a second direction perpendicular to the first direction. An example of a plan view of a portion of the photo-mask 1 is illustrated in FIG. 4. The photo-mask 1 has a pattern 1a consisting of a land portion 1a1 and a lead portion 1a2. The laser beam transmitted through the photo-mask 1 passes through a focusing lens 8, then is projected onto an angle detection device 10 which detects the angle $\alpha$ between the edge of the pattern 1a and the scan line.

When a laser beam passes through the edge of the pattern, the laser beam is diffracted in a direction perpendicular to the edge line of the pattern. Accordingly, it is possible to detect the angle of the edge line of the pattern with respect to the scan line by detecting the orientation of the diffraction pattern so produced by means of the angle detecting device 10.

The details of the angle detecting device 10 are illustrated in FIG. 2. The angle detecting device includes light detecting elements $A_1$, $B_1$, $C_1$, $D_1$, $A_2$, $B_2$, $C_2$, $D_2$. Each pair of the elements $A_1$, $A_2$; $B_1$, $B_2$; $C_1$, $C_2$; and $D_1$, $D_2$ is arranged across from each other and a center line passing through the element pair forms a 45° angle with respect to the center line of the next adjacent pair.

When a light passing through a portion of the edge of the pattern 1a of the photo-mask 1 is received by the angle detecting device 10 and the angle of the edge with respect to the scan line at this portion is 0°, an output signal 101A indicating a 0° angle of the edge line of the pattern is obtained from the pair of elements $A_1$, $A_2$. In the same way, output signals 101B, 101C and 101D indicating 45°, 90° and 135°, respectively, of the angles of the edges of the pattern with respect to the scan line are obtained from the pairs of elements $B_1$, $B_2$; $C_1$, $C_2$; and $D_1$, $D_2$, respectively.

A process to detect the light transmitted through a pattern will now be described. A light detecting element 9 located at the center of the angle detecting device 10 receives the laser beam transmitted through the focusing lens 8. The light detecting element 9 produces an output signal 91, representing the intensity of the light passing through a portion of the photo-mask 1, so that the output signal represents the light has been transmitted through the portion of the photo-mask 1.

A process to store the signals 101A, 101B, 101C and 101D, indicating the directions of the edge of the pattern; and the signal 91, indicating the light transmission through the pattern, will now be described. The output signal 101A of the light detecting elements $A_1$, $A_2$ is applied to a comparator 111 to produce either a binary signal "1" or "0" in accordance with the value of the output signal 101A. This binary output signal of the comparator 111 is stored in a memory circuit 121 of the memory device 12. In the same way, the binary output signal of a comparator 112 receiving the signal 101B is stored in a memory circuit 122 of the memory device 12, the binary output signal of a comparator 113 receiving the signal 101C is stored in a memory circuit 123 of the memory device 12, and the binary output signal of a comparator 114 receiving the signal 101D is stored in a memory circuit 124 of the memory device 12. The outpt signal 91 of the light detecting element 9 is applied to a comparator 115 to produce either a binary signal "1" or "0" in accordance with the value of the output signal 91. This binary output signal of the comparator 115 representing the body of the pattern and corresponding to light transmission (transparent) or light interruption (opaque) is stored in a memory circuit 125 of the memory device 12. Each of the memory circuits 121, 122, 123, 124 and 125 consists of a shift register.

Now a process to measure the width of a portion of a pattern and a process to detect defects in the pattern will be described. The details of a circuit 13 for measuring the width of a portion of a pattern and detecting defects in the pattern are illustrated in FIG. 3. An example of the pattern 1a consisting of the land portion 1a1 and the lead portion 1a2 running at a 45°-angle with respect to the scanning direction on the photo-mask 1 is illustrated in FIG. 4. An example of a set of memory states 121M, 122M, 123M and 125M for the pattern 1a illustrated in FIG. 4 in the memory circuits 121, 122, 123 and 125, respectively, of the memory device 12 is illustrated in FIG. 5.

Figure 5:
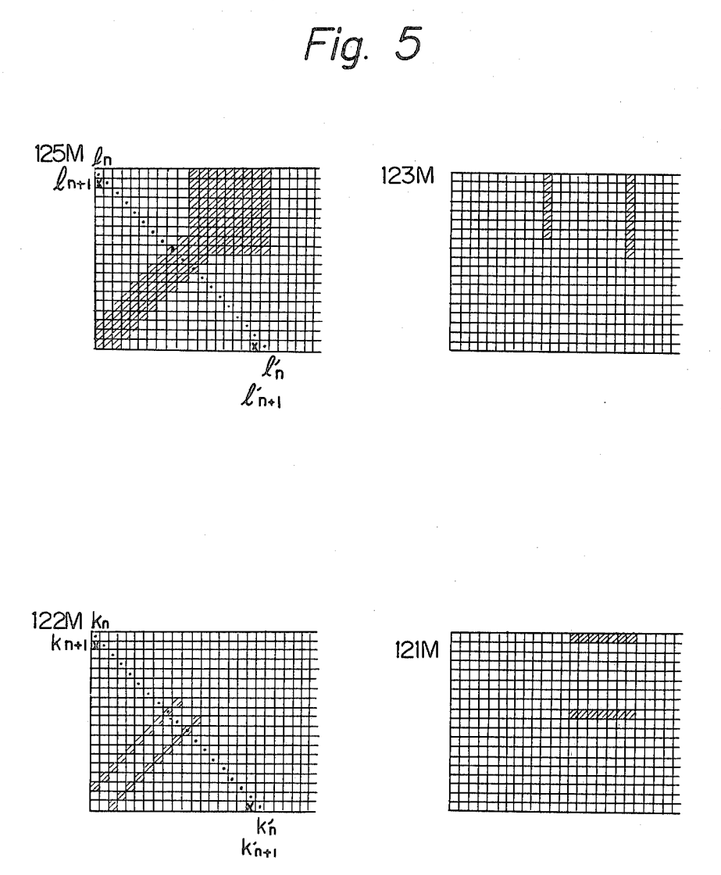
FIG. 5 illustrates the status of the memory of the memory device in the system of FIG. 1.

In FIG. 5, a state 121M of the memory circuit 121 for the signal 101A indicating the 0° orientation of the edge of the pattern, a state 122M of the memory circuit 122 for the signal 101B indicating the 45° orientation of the edge of the pattern, a state 123M of the memory circuit 123 for the signal 101C indicating the 90° orientation of the edge of the pattern, and a state 125M of the memory circuit 125 for the signal 91 indicating the body of the pattern or the transmission or lack of transmission of light through the pattern are illustrated. No memory state of the memory circuit 124M is illustrated in FIG. 5, because no edge of the direction of 135° exists in the pattern 1a as illustrated in FIG. 4.

Measurement of the width of the lead portion 1a2 of the pattern illustrated in FIG. 4 is effected as follows. Information stored in the cells of the memory circuit 122 for the 45° orientation, as illustrated in 122M, is read-out in the 135° orientation of the dotted line $k_n$ to $k'_n$ and the read-out information is registered in a shift register 14. The orientation of the reading-out is perpendicular to the angle of the edge of the pattern. Information stored in the cells of the memory circuit 125 representing the body of the pattern or the degree of transmission of light as illustrated in 125M is read-out in the direction of the dotted line $l_n$ to $l'_n$ which is the same direction as $k_n$ to $k'_n$, and this read-out information is registered in a shift register 15.

The presence of registered information in the shift register 14 is detected by an OR circuit 16 which receives the signals in parallel from the elements of the shift register 14. The number of bits "1" registered in the shift register 15 is detected by a bit summing circuit 17 which receives the signals in parallel from the elements of the shift register 15. An output of the bit summing circuit 17 which represents the width of the pattern is compared in a window comparator 18 with a predetermined maximum value (MAX) of the width of the pattern and with a predetermined minimum value (MIN) of the width of the pattern, so that the measured width of the pattern is checked to determine whether it falls within the range between said predetermined maximum and minimum values. An output of the OR circuit 16 and an output of the window comparator 18 are supplied to an AND gate 19. When the output of the OR circuit 16 is a signal indicating the presence of the pattern edge and the output of the window comparator 18 is a signal indicating that the measured width of the pattern falls outside the range between said predetermined maximum and minimum values, an error signal indicating a presence of a defect in the pattern is produced from the AND gate 19. This produced error signal is written into the corresponding address of a memory 20 for storing information concerning defects in the pattern.

In the same way, a reading-out of the information in the direction $k_{n+1}$ to $k'_{n+1}$, which is adjacent to and parallel with the direction $k_n$ to $k'_n$, and a reading-out of the information in the direction $l_{n+1}$ to $l'_{n+1}$, which is adjacent to and parallel with the direction $l_n$ to $l'_n$ are effected, and accordingly the width of the pattern along the direction $l_{n+1}$ to $l'_{n+1}$ is measured. In the same way, a measurement of the width of the pattern along the 90° orientation is effected by means of the memory circuits 121M and 125M, and a measurement of the width of the pattern along the 0° orientation is effected by means of the memory circuits 123M and 125M.

Modifications of the embodiment described hereinbefore will now be described with reference to FIGS. 6 through 10.

Figure 6:
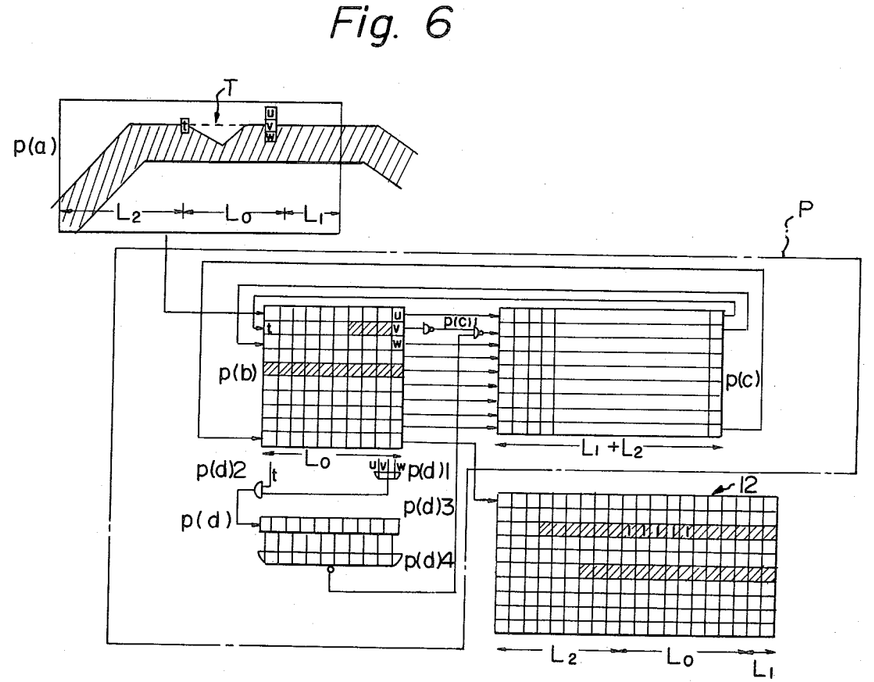
FIG. 6 is a schematic diagram of an interpolation circuit applicable to the pattern inspection system of FIG. 1.

A circuit P for interpolating a missing pattern edge signal is illustrated in FIG. 6. The circuit P is connected between the comparator 11 and the memory device 12 as illustrated in FIGS. 1 and 2. If a portion T of a pattern p(a) is defective and a portion of a straight edge line in the 0° orientation is missing in the portion T, it is impossible to measure the width of the pattern in the portion T because no pairs of pattern edge signals in the 0° orientation are obtained in the portion T. In order to solve this problem, a circuit P for interpolating a missing pattern edge signal is provided, as illustrated in FIG. 6.

The circuit P includes a first shift register p(b) having N lines, each line of which includes Lo bits, a second shift register p(c) having (N-1) lines, each line of which includes ($L_1+L_2$) bits and a bit interpolating circuit p(d).

In the circuit P, a sequence of pattern edge signals produced by scanning the pattern p(a) is registered in the first line of a shift register p(b) and shifted along the line, then a sequence of output signals of the shift register p(b) is registered in the first line of a shift register p(c). A sequence of output signals of the nth line of the shift register p(c) is supplied to the (n+1)th the of the shift register p(b). A sequence of output signals of the Nth line of the shift register p(b) is supplied to and stored in a memory device 12 for storing pattern edge signals.

If a signal is present in any one of the cells u, v and w, which are located at a predetermined distance from a cell t the OR gate p(d)1 produces an output signal, if a signal is also present in cell t, then the AND gate p(d)2 produces an output, and accordingly, a signal "1" is supplied to the shift register p(d)3 of the interpolating circuit P. Data ($X_1, X_2, \ldots X_n$) registered in the shift register p(d)3 are supplied in parallel to a NOR gate p(d)4. The NOR gate p(d)4 produces a signal "0" when at least one "1" signal is present in the shift register p(d)3. Thus, the NAND gate p(c)1 produces a signal "1" in the case where the signal of the cell v is "1", while the NAND gate p(c)1 produces a signal "0" in the case where the signal of the cell v is "0" and the signal output by p(d)4 is "1". Accordingly, the data of the cell v is converted. The relationship between the data of the cells u, v and w and the converted data of the cell v is indicated in the table below.

TABLE

| t | 1 | 1 | 1 | 1 | 0 | 0 | 0 | 0 | 0 | 0 |
|---|---|---|---|---|---|---|---|---|---|---|
| Logical Sum of u, v and w | 1 | 1 | 0 | 0 | 1 | 1 | 1 | 1 | 0 | 0 |
| Logical Sum of $x_1$ through $x_n$ | 1 | 1 | 1 | 0 | 1 | 1 | 0 | 0 | 1 | 0 |
| Output of p(d) 4 | 0 | 0 | 0 | 1 | 0 | 0 | 1 | 1 | 0 | 1 |
| v | 1 | 0 | 0 | 0 | 1 | 0 | 1 | 0 | 0 | 0 |
| Converted v | 1 | 1 | 1 | 0 | 1 | 1 | 1 | 0 | 1 | 0 |

The information represented by this signal "1" is transmitted through a NOR gate p(d)4 and a NAND gate p(c)1 and supplied to the second line of the shift register p(c), so that the all signals in the sequence of cells t through v are made "1". Accordingly, an interpolation of the missing portion of the edge line of the defective portion T in the pattern p(a) is achieved. A sequence of output signals of the shift register p(b), including the thus interpolated signals, is supplied to and stored in the memory device 12. A measurement of the width of a pattern having defects is the effected in the circuit 13 with the aid of the information stored in this the memory device 12.

Figure 7:
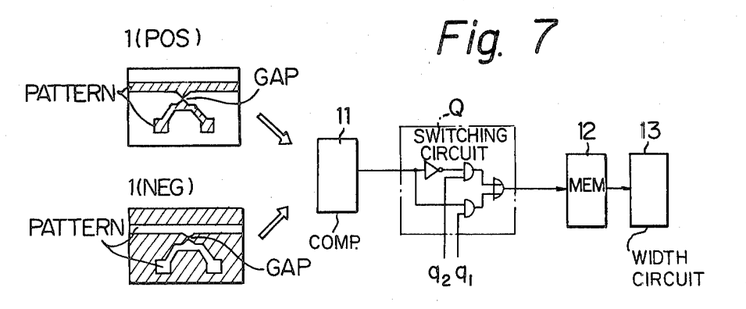
FIG. 7 is a schematic diagram of a pattern data switching circuit applicable to the pattern inspection system of FIG. 1.

A pattern data switching circuit Q for selecting the correspondence of signal "1" to either light transmission or light interruption is illustrated in FIG. 7. In the case where a measurement of the width of the pattern of a positive film 1 (POS) or the gap between the patterns of a negative film 1 (NEG) is desired, a signal "1" is supplied to the input $q_1$ of the circuit Q and signal "0" is supplied to the input $q_2$ of the circuit Q. In this case, binary signals representing light transmission and light interruption are stored in the memory device 12 without inversion. In the case where a measurement of the gap between the patterns of a positive film 1 (POS) or the width of the pattern of a negative film 1 (NEG) is desired, a signal "0" is supplied to the input $q_1$ of the circuit Q and a signal "1" is supplied to the input $q_2$ of the circuit Q. In this case, the original binary signals representing light transmission and light interruption are inverted by the circuit Q and the thus inverted binary signals are stored in the memory device 12.

Figure 8:
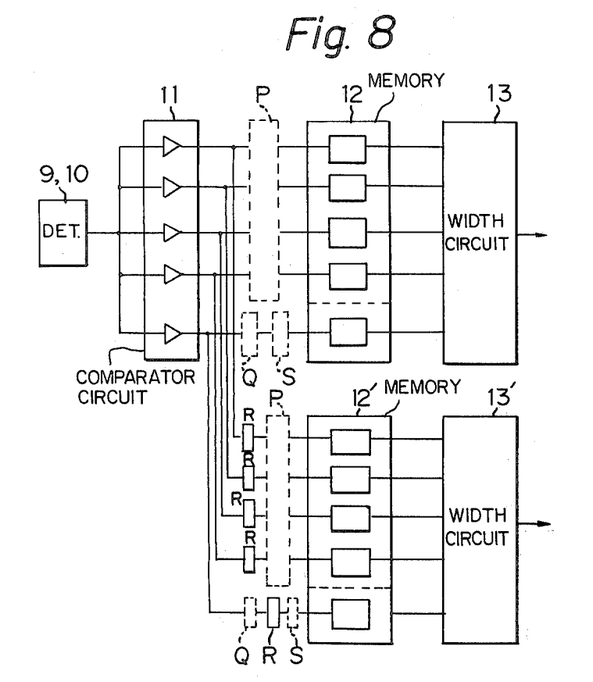
FIG. 8 is a schematic diagram of a pattern information reducing circuit applicable to the pattern inspection system of FIG. 1.
Figure 9:
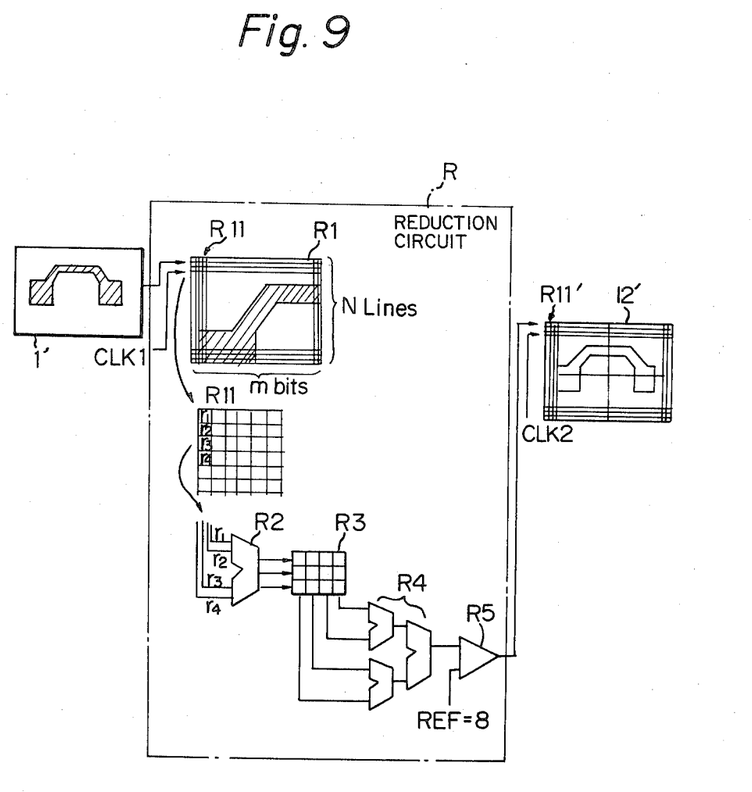
FIG. 9 illustrates the details of the circuit of FIG. 8.

A device R for reducing the pattern information stored in a memory circuit is illustrated in FIG. 9. The device R is connected between the comparaor 11 and a memory device 12' as illustrated in FIG. 8. The memory device R for storing a reduced pattern includes a pattern data memory circuit R1 having N lines, each line of which includes m bits, a summing circuit R2, a shift register R3 having 3×4 bits, another summing circuit R4 and a comparator R5. In the shift register R1, the output of the nth line is supplied to the input of the (n+1)th line. The operation of the memory device R for storing a reduced pattern will be described with respect to, for example, a portion R11 having 4×4 bits of the pattern data memory circuit R1. Signals $r_1, r_2, r_3$ and $r_4$, each of which is stored in the first bit of the lines of the portion R11, are sent to the summing circuit R2, which produces a 3 bit output signal representing a sum of the signals $r_1, r_2, r_3$ and $r_4$. This output signal of the summing circuit R2 is supplied to the first line of the shift register R3 and registered in the shift register R3. A sequence of output signals of the shift register R3 is supplied to the summing circuit R4, which produces an output signal representing a sum of the sequence of output signals of the shift register R3. The output signal of the summing circuit R4 represents the number of the signals "1" in the portion R11 of 16 bits. The summing circuit R4 output signal and a reference signal representing a number 8 are supplied to the comparator R5. The comparator R5 produces an output signal "1" whenever the output signal of the summing circuit R4 is greater than or equal to 8. In this case the average signal for the portion R11 is the signal "1". The comparator R5 produces an output signal "0" whenever the outpt signal of the summing circuit R4 is less than or equal to 7. In this case, the average signal for the portion R11 is regarded as the signal "0". The comparator circuit R5 output signal, either "1" or "0", is supplied to and stored in the cell R11', located in the first line in the first column of a memory device 12' for the reduced pattern data. Thus, the average signal of the portion R11 of the memory circuit R1 is represented by the signal of the cell R11' of the memory device 12'. Accordingly, a reduction of pattern information stored in R1 by a ratio of 16:1 is achieved.

Figure 10:
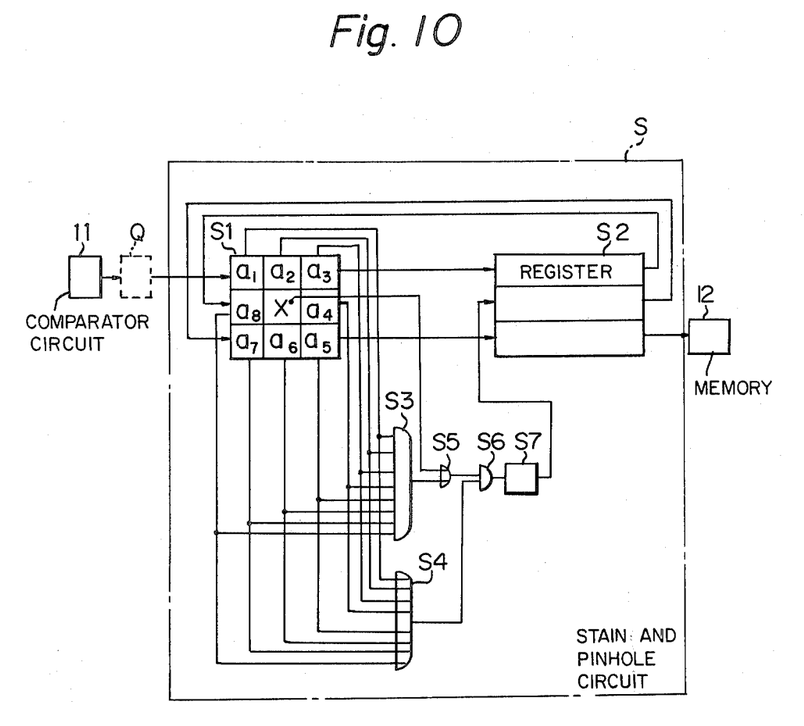
FIG. 10 is a schematic diagram of a stain and pinhole elimination circuit applicable to the pattern inspection system of FIG. 1.

A stain and pinhole elimination circuit S is illustrated in FIG. 10. The stain and pinhole elimination circuit S includes a shift register S1 having 3×3 bits, a shift register S2 having 3 lines, an AND gate S3, an OR gate S4, an OR gate S5, an AND gate S6 and a flip-flop circuit S7. A sequence of signals from the comparator 11 is supplied to the first line of the shift register S1 and shifted in the direction of the line. In order to determine whether a signal X registered in the central bit of the shift register S1 is a signal representing a light interrupting stain location in a light transmitting portion of a photo-mask or a light transmitting pinhole in a light interrupting portion of a photo-mask, eight signals $a_1$, $a_2$, $a_3$, $a_4$, $a_5$, $a_6$, $a_7$ and $a_8$, registered in eight bits surrounding the bit for the signal X, are checked.

Whenever each of the signals $a_1$ through $a_8$ is a signal "1", the output of the output AND gate S3 and the OR gate S4 produce an output signal "1", this results in, the AND gate S6 producing an output signal "1", and as a result, the flip-flop circuit S7 is set to a "1" state. Output signals "1" of the flip-flop circuit S7 are supplied, after a delay of one bit, to the first bit of the second line of the shift register S2. Thus when the signal X is a signal "0", this signal "0" is inverted into a signal "1" and sent to the second line of the shift register S2. Thus, elimination of a pinhole is achieved.

Whenever each of the signals $a_1$ through $a_8$ is a signal "0", the AND gate S3 and the OR gate S4 produce an output signal "0", this results in the AND gate S6 producing an output signal "0", and as a result, the flip-flop circuit S7 is set to a "0" state. Output signals "0" of the flip-flop circuit S7 are supplied, after a delay of one bit, to the first bit of the second line of the shift register S2. Thus, when the signal X is a signal "1", this signal "1" is inverted into a signal "0" and sent to the second line of the shift register S2. Thus, elimination of a stain is achieved.

In the case where the signals $a_1$ through $a_8$ include both signals "1" and signals "0", the AND gate S3 produces an output signal "0" and the OR gate S4 produces an output signal "1". Thus, the AND gate S6 produces the same signal as the signal X, and accordingly, the flip-flop circuit S7 is caused to be set to the same state as the signal X. Therefore, after a one bit delay the signal X itself is sent to the second line of the shift register S2 without inversion. This means that the signal X is determined to be neither a pinhole nor a stain.

We claim:

1. A pattern inspection system for inspecting a pattern formed on a base, the pattern having a body and edges, said inspection system obtaining information regarding the light transmission or lack of light transmission through the pattern by scanning the pattern with a light beam, said inspection system comprising:
    detection means, including means for separately detecting the body of the pattern and generating body signals representing the body of the pattern and means for separately detecting the pattern edges and the angle of the edges with respect to a predetermined line and generating edge signals representing the edge of the pattern;
    first memory means having a plurality of memory units, operatively connected to said pattern body detection means and said edge detection means, for separately storing the body signals and the edge signals in separate memory units of said first memory means, wherein a first of the plurality of the memory units stores the body signals, wherein the remaining units of the plurality of memory units store the edge signals, wherein each of the remaining units represents the angle of the edge signals stored therein; and
    width measuring means, operatively connected to said first memory means, for measuring the width of the body of the pattern between two edges of the pattern by summing the body signals between the two edges of the pattern.

2. A pattern inspection system as recited in claim 1, wherein the pattern has an irregular edge, said pattern inspection system further comprising interpolation means, operatively connected between said detection means and said first memory means, for converting the edge signals representing the irregular edge of the pattern, when a portion of the edge of the pattern is irregular along a predetermined length of the edge of the pattern, from a state representing light transmission to a state representing light interruption or from a state representing light interruption to a state representing light transmission in dependence upon whether the irregular edge should be light transmitting or light interrupting.

3. A pattern inspection system as recited in claim 1 or 2 wherein the base is either light transmitting or light interrupting, said pattern inspection system further comprising switching means, operatively connected between said detection means and said first memory means, for converting the body signals and the edge signals from a state representing light transmission to a state representing light interruption or from a state representing light interruption to a state representing light transmission in dependence upon whether the base is light transmitting or light interrupting.

4. A pattern inspection system as recited in claim 1 or 2, further comprising:
    reduction means, operatively connected to said detection means, for reducing the edge signals and body signals by generating average body signals and average edge signals, which average body signals represent whether the body signals representing the body within a predetermined area of the pattern are, on the average, light transmitting or light interrupting, and which average edge signals represent whether the edge signals representing the edge of the pattern along a predetermined length of an edge of the pattern are, on the average, light transmitting or light interrupting; and
    second memory means, operatively connected to said reduction means, for storing the average body signals and average edge signals.

5. A pattern inspection system as recited in claim 1 or 2, wherein the pattern contains a stain and a pinhole and wherein the body signals include a first defect component and a second defect component, said pattern inspection system further comprising stain and pinhole correction means operatively connected between said detection means and said first memory means, including means for detecting the presence of the first defect component representing a light interrupting stain, including means for detecting the presence of the second defect component representing a light transmitting pinhole, and including means for converting the first defect component into a first corrected signal representing light transmission and for converting the second defect signal into a second corrected signal representing light interruption, the first and second corrected signals representing corrected body signals, prior to transmitting the body signals to the said first memory means.

6. A pattern inspection system as recited in claim 2, wherein said edge interpolation means comprises:
    a first multiple line shift register having N lines, where N is an integer greater than or equal to 4, each line having an interpolation register input and an interpolation register output, and having a plurality of cells in each line, each cell having a cell output, the first interpolation register input operatively connected to said detection means, and the Nth interpolation register output operatively connected to said first memory means;

a NOT gate having an input operatively connected to the second interpolation register output, and having an output;

a NAND gate having a first input operatively connected to the output of said NOT gate, having a second input, and having an output;

a second multiple line shift register having N-1 lines, each line having a temporary register input and a temporary register output, and having a plurality of cells in each line, the first temporary register input operatively connected to the first interpolation register output, the first temporary register output operatively connected to the second interpolation register input, the output of said NAND gate operatively connected to the second temporary register input, the second temporary register output operatively connected to the third interpolation register input, the N-1th temporary register output operatively connected to the Nth interpolation register input, the N-1th temporary register input operatively connected to the N-1th interpolation register output;

a first OR gate having a first input operatively connected to the first interpolation register output, having a second input operatively connected to the second interpolation register output, having a third input operatively connected to the third interpolation register output, and having an output;

an AND gate having a first input operatively connected to a predetermined cell output in the second line of said first multiple line shift register, having a second input operatively connected to the output of the first OR gate, and having an output;

a single line shift register having an input operatively connected to the output of said AND gate, and having a plurality of cells and single line cell outputs for each cell; and a second OR gate having a plurality of inputs operatively connected to the respective single line cell outputs of the said single line shift register, and having an output operatively connected to the second input of said NAND gate.

7. A pattern inspection system as recited in claim 3, wherein said switching means is operatively connected to receive first and second switching signals, wherein said switching means comprises:

a NOT gate having a NOT input operatively connected to said detection means, and having an output;

a first AND gate having a first input operatively connected to the output of said NOT gate, having a second input operatively connected to receive the first switching signal, and having an output;

a second AND gate having a first input operatively connected to said detection means, having a second input operatively connected to receive the second switching signal, and having an output; and an OR gate having a first input operatively connected to the output of the first AND gate, having a second input operatively connected to the output of the second AND gate, and having an output operatively connected to said first memory means.

8. A pattern inspection system as recited in claim 4, wherein said reduction means is operatively connected to receive a reference signal, wherein said reduction means comprises:

fourth memory means, operatively connected to said detection means, having a plurality of lines for storing the body signals and the edge signals;

a first summing circuit having first summing inputs respectively connected to said plurality of lines of said fourth memory means, and having first summing outputs, said first summing outputs representing the sum of said first summing inputs;

a shift register circuit having a plurality of lines, having a plurality of cells within each line, having shift register line inputs operatively connected to the respective first summing outputs of said first summing circuit, and having a plurality of shift register outputs;

a second summing circuit, having second summing inputs operatively connected to the respective outputs of said shift register circuit, and having second summing outputs, for generating a summing signal representing the sum of the second summing inputs; and a comparator circuit, having a first input operatively connected to the second summing outputs of said second summing circuit, having a second input operatively connected to receive the reference signal, and having an output operatively connected to said second memory means, for comparing the summing signal from the said second summing circuit to the reference signal, and for generating an output signal representing that the number of cells of said fourth memory means compared and found to be containing a pattern signal is greater than the value of the reference signal.

9. A pattern inspection system as recited in claim 5, wherein said stain and pinhole correction means comprises:

a first shift register circuit having three lines and having three cells within each line each cell having a cell input and a cell output, the cell input of the first cell of said first shift register circuit operatively connected to said detection means;

a first AND gate having a first input operatively connected to the cell output of the first cell in the first line of said the first shift register circuit, having a second input operatively connected to the cell output of the second cell in the first line of said first shift register circuit, having a third input operatively connected to the cell output of the third cell in the first line of said first shift register circuit, having a fourth input operatively connected to the cell output of the third cell in the second line of said first shift register circuit, having a fifth input operatively connected to cell output of the third cell in the third line of said first shift register circuit, having a sixth input operatively connected to the cell output of second cell in the third line of said first shift register circuit, having a seventh input operatively connected to the cell output of first cell in the third line of said first shift register circuit, having an eighth input operatively connected to the cell output of first cell in the second line of said first shift register circuit, and having an output;

a first OR circuit having a first input operatively connected to the cell output of the first cell in the first line of said first shift register circuit, having a second input operatively connected to the cell output of the second cell in the first line of said first shift register circuit, having a third input operatively connected to the cell output of the third cell in the first line of said first shift register circuit, having a fourth input operatively connected to the cell output of the third cell in the second line of said first shift register circuit, having a fifth input operatively connected to the cell output of the third cell in the third line of said first shift register circuit, having a sixth input operatively connected to the cell output of the second cell in the third line of said first shift register circuit, having a seventh input operatively connected to the cell output of the first cell in the third line of said first shift register circuit, having an eighth input operatively connected to the cell output of the first cell in the second line of said first shift register circuit, and having an output;

a second OR gate having a first input operatively connected to the cell output of the second cell of the second line of said first shift register circuit, having a second input operatively connected to the output of said first AND circuit, and having an output;

a second AND gate having a first input operatively connected to the output of said second OR gate, having a second input operatively connected to the output of the said first OR gate, and having a second AND output;

a flip-flop circuit having a flip-flop input operatively connected to the output of said second AND gate, and having a flip-flop output; and a second shift register circuit having three lines and a plurality of cells within each line, each line having a line input and a line output, the first line input operatively connected to the cell output of third cell in the first line of said first shift register circuit, the second line input operatively connected to the flip-flop output, the third line input operatively connected to the cell output of the third cell in the third line of the said first shift register circuit, the first line output operatively connected to the cell input of the first cell in the second line of said first shift register circuit, the second line output operatively connected to the cell input of the first cell of the third line of said first shift register circuit, and the third line output operatively connected to said first memory means.

10. A pattern inspection system for inspecting a pattern formed on a base and having a body and edges, comprising:
means for providing a light beam;
means for scanning the pattern with the light beam and for generating a pattern signal representing the pattern, said pattern signal including a body signal component representing the body of the pattern and an edge signal component representing the edge of the pattern;
first detection means, operatively connected to said scanning means, for detecting the body signal component and for generating body signals representing the body signal component of the pattern signal;
second detection means, operatively connected to said scanning means, for detecting the edge signal component, and for generating edge signals representing the edge signal component of the pattern signal, the edge signals comprising angled edge signals, each of the angled edge signals representing the edge signal component and the angle of the edge of the pattern with respect to a predetermined line;

first memory means, operatively connected to both said first and second detection means, having a plurality of memory units including a first memory unit for storing the body signals, the remaining memory units for separately storing the angled edge signals in the respective memory unit representing the angle of the respective edge of the pattern with respect to the predetermined line;

width measuring means having a predetermined width range, operatively connected to said first memory means, for measuring the width of the body of the pattern between two edges of the pattern, by summing the body signals stored in said first memory means in dependence upon the detection of the angled edge signals stored in said first memory means, detecting the angled edge signals represents that there are edges of the pattern between which a width can be measured, and for comparing the sum of the body signals with the predetermined width range and for generating an error signal whenever the width of the pattern is outside the predetermined width range; and third memory means, operatively connected to the width measuring means, for storing the error signals generated by the width measuring means.

11. A pattern inspection system as recited in claim 10, wherein said first detection means is operatively connected to receive a predetermined light detection signal, wherein said first detection means comprises:
means for detecting the light beam passing through the pattern and generating a light body signal; and
a comparison circuit, operatively connected to said light detecting means, for outputting a body signal whenever the light body signal is greater than the predetermined light detection comparison signal.

12. A pattern inspection system as recited in claim 10, wherein the light beam is diffracted as it passes through the edge of the pattern resulting in a diffracted light beam, wherein said second detection means is operatively connected to receive a predetermined diffracted light detection comparison signal, wherein said second detection means comprises:
light detecting means, including first through eighth detectors, for detecting the diffracted light beam passing through the edge of the pattern, wherein the first light detector abuts the second light detector, wherein the second light detector abuts the third light detector, wherein the third light detector abuts the fourth light detector, wherein the fourth light detector abuts the fifth light detector, wherein the fifth light detector abuts the sixth light detector, wherein the sixth light detector abuts the seventh light detector, wherein the seventh light detector abuts the eighth light detector, wherein the eighth light detector abuts the first light detector, wherein the first light detector is operatively connected to the fifth light detector, wherein the second light detector is operatively connected to the sixth light detector, wherein the third light detector is operatively connected to the seventh light detector, wherein the fourth light detector is operatively connected to the eighth light detector, resulting in first through fourth light detector pairs, each light detector pair producing a diffracted light detection signal whenever one of the light detectors in the pair detects the diffracted light beam; and first through fourth comparator circuits operatively connected to said first through fourth light detector pairs, respectively, said first through fourth comparator circuits generating an angled edge signal whenever the diffracted light detection signal is equal to the predetermined diffracted light detection comparison signal.

13. A pattern inspection system as recited in claim 1 or 10, wherein said width detection means is operatively connected to receive a first and second comparison value, wherein said width measuring means comprises:

a first shift register circuit operatively connected to the angled edge signal memory units of said first memory means and having a plurality of first shift register outputs;

an OR circuit having a plurality of inputs each of which is connected to one of the first shift register outputs of said first shift register circuit, and having an output;

an AND gate having a first input operatively connected to the output of said OR circuit, having a second input, and having an output operatively connected to said third memory means;

a second shift register circuit operatively connected to the first memory unit of said first memory means, and having a plurality of second shift register outputs;

a bit summing circuit, having a plurality of inputs operatively connected to the second shift register outputs, and having outputs, for generating a summing signal representing the sum of the inputs; and a window comparison circuit, having a first input operatively connected to the outputs of said bit summing circuit, having second and third inputs operatively connected to receive first and second comparison values, respectively, and having an output operatively connected to the second input of said AND gate, for comparing the value of the summing signal with the first and second comparison values, and for generating an out of range signal whenever the value of the summing signal is not within the range determined by the first and second comparison values.

* * * * *

UNITED STATES PATENT AND TRADEMARK OFFICE
CERTIFICATE OF CORRECTION

PATENT NO. : 4,392,120

DATED : July 5, 1983

INVENTOR(S) : Kikuo Mita et al

It is certified that error appears in the above-identified patent and that said Letters Patent is hereby corrected as shown below:

Title page, [53] Assignee: "A. Aoki & Associates, Tokyo" should be --Fujitsu Limited, Kawasaki--;

[57] ABSTRACT, line 4, after "pattern", insert --,--.

Column 1, line 36, "problem" should be --problems--;

line 64, delete "a";

"the", first occurrence, should be --a--.

Column 2, line 41, "not" should be --now--;

line 43, "glavanically" should be --galvanically--;

line 44, "activated" should be --actuated--.

UNITED STATES PATENT AND TRADEMARK OFFICE
CERTIFICATE OF CORRECTION

PATENT NO. : 4,392,120
DATED : July 5, 1983
INVENTOR(S) : Kikuo Mita et al

It is certified that error appears in the above-identified patent and that said Letters Patent is hereby corrected as shown below:

Column 3, line 37, "outpt" should be --output--;

line 57, "45°-angle" should be --45° angle--.

Column 4, line 16, "l", both occurrences, should be -- --;

line 49, "l", both occurrences, should be -- --;

line 50, "l", both occurrences, should be -- --;

line 52, "l", both occurrences, should be -- --.

Column 5, line 16, "the", second occurrence, should be --line--;

line 59, "the", second occurrence, should be --then--;

line 61, delete "this".

UNITED STATES PATENT AND TRADEMARK OFFICE
CERTIFICATE OF CORRECTION

PATENT NO. : 4,392,120

DATED : July 5, 1983

INVENTOR(S) : Kikuo Mita et al

Page 3 of 3

It is certified that error appears in the above-identified patent and that said Letters Patent is hereby corrected as shown below:

Column 6, line 15, "comparor" should be --comparator--;

line 46, "outpt" should be --output--;

line 68, "location" should be --located--.

Column 7, line 12, after "Thus", insert --,--.

Signed and Sealed this

Twenty-sixth Day of June 1984

[SEAL]

Attest:

*Attesting Officer*

GERALD J. MOSSINGHOFF

*Commissioner of Patents and Trademarks*